UNITED STATES PATENT OFFICE.

MICHAEL F. MAGINNIS, OF PHILADELPHIA, PENNSYLVANIA.

FUEL-BRIQUET AND METHOD OF MAKING THE SAME.

No. 795,294.            Specification of Letters Patent.            Patented July 25, 1905.

Application filed January 23, 1904. Serial No. 190,380.

*To all whom it may concern:*

Be it known that I, MICHAEL F. MAGINNIS, a citizen of the United States, residing at Philadelphia, in the State of Pennsylvania, have invented a new and useful Fuel-Briquet and Method of Making the Same, of which the following is a specification.

This invention relates to artificial fuel, and more particularly to a briquet formed from powdered combustible material—such as coal, lignite, coke, and similar substances—combined with various ingredients for the purpose of producing a homogeneous mass; and the invention relates also to the method of combining these various ingredients to produce the desired result.

The object of my invention is to provide a fuel-briquet which will harden without baking; and another object is to provide a briquet of this kind which will not absorb moisture or be affected by climatic changes and one which will be practically smokeless while burning and one which will be nearly completely consumed, leaving an exceedingly small amount of ashes or residue.

With these objects in view my invention consists in the combination of the various ingredients, hereinafter fully set forth and claimed, and also in the method of combining the said ingredients.

In producing a fuel-briquet in accordance with my invention I employ two thousand pounds of bituminous coal finely powdered, with which is mixed one hundred and fifty pounds of plaster-of-paris, and to this mixture I also add twenty pounds of sieved anthracite-coal ashes and also seventy-five pounds of salt and fifteen pounds of alum, all thoroughly mixed and commingled in a dry state. A waterproofing solution is then made which consists of four gallons of molasses and sixteen gallons of water at a temperature of 130° Fahrenheit, thus making a solution of twenty gallons, to which is added twenty pounds of meal, the residue of linseed-oil, which is added to the molasses solution for the purpose of waterproofing the entire mass. The waterproofed molasses solution is then poured into the mixture of coal, plaster-of-paris, ashes, salt, and alum and the entire mass thoroughly mixed for a period of three minutes, after which time the mass is ready for the press, and after being pressed the briquet so made is left to dry, but is not baked, for the reason that the ingredients employed in combination with the combustibles form a perfect self-setter, and all baking is entirely avoided.

A briquet constructed in the manner herein described burns readily and emits little or no smoke and is almost entirely consumed. Furthermore, the ingredients of molasses, alum, and plaster-of-paris are used in such proportions that the mass will set quickly into a hard briquet; but the setting operation will not be so quick as to produce any disintegration of the mass, and by the employment of the meal from linseed-oil residue the entire mass is waterproofed, so that it is not subject to climatic conditions.

Having thus fully described my invention, what I claim as new, and desire to secure by Letters Patent, is—

1. A fuel-briquet consisting of powdered coal, plaster-of-paris, ashes, salt, alum, molasses, water, and meal, the residue of linseed-oil, combined substantially as described.

2. A fuel-briquet consisting of the following ingredients, combined in substantially the proportions set forth, namely two thousand pounds finely-powdered bituminous coal, one hundred and fifty pounds plaster-of-paris, twenty pounds anthracite ashes, seventy-five pounds of salt, fifteen pounds of alum, four gallons of molasses, sixteen gallons of water, and twenty pounds of meal, the residue of linseed-oil.

3. The herein-described method of producing a fuel-briquet which consists in providing a dry mixture of finely-powdered bituminous coal, plaster-of-paris, coal-ashes, salt, alum; preparing a solution consisting of molasses, water, and meal, the residue of linseed-oil; and then combining the said dry mixture and solution and thoroughly mixing for a predetermined time, and then molding into briquets.

4. The herewithin-described method of producing a fuel-briquet in first providing a dry mixture composed of the following ingredients combined in the following proportions, namely two thousand pounds finely-powdered bituminous coal, one hundred and fifty pounds of plaster-of-paris, twenty pounds of coal-ashes, seventy-five pounds of salt, and fifteen pounds of alum; preparing a solution consisting of four gallons of molasses, and sixteen gallons of water, to which is added twenty pounds of meal, the residue of linseed-oil, the solution and dry mixture being thoroughly mixed for a period of three minutes, then pressing or molding into briquets, substantially as described.

MICHAEL F. MAGINNIS.

Witnesses:
 ISAAC D. HETZELL,
 RICHARD CURRY.